Feb. 3, 1948. J. H. BRODIE 2,435,197
LANDING AND LAUNCHING APPARATUS FOR AIRCRAFT
Filed Oct. 4, 1944 10 Sheets-Sheet 1
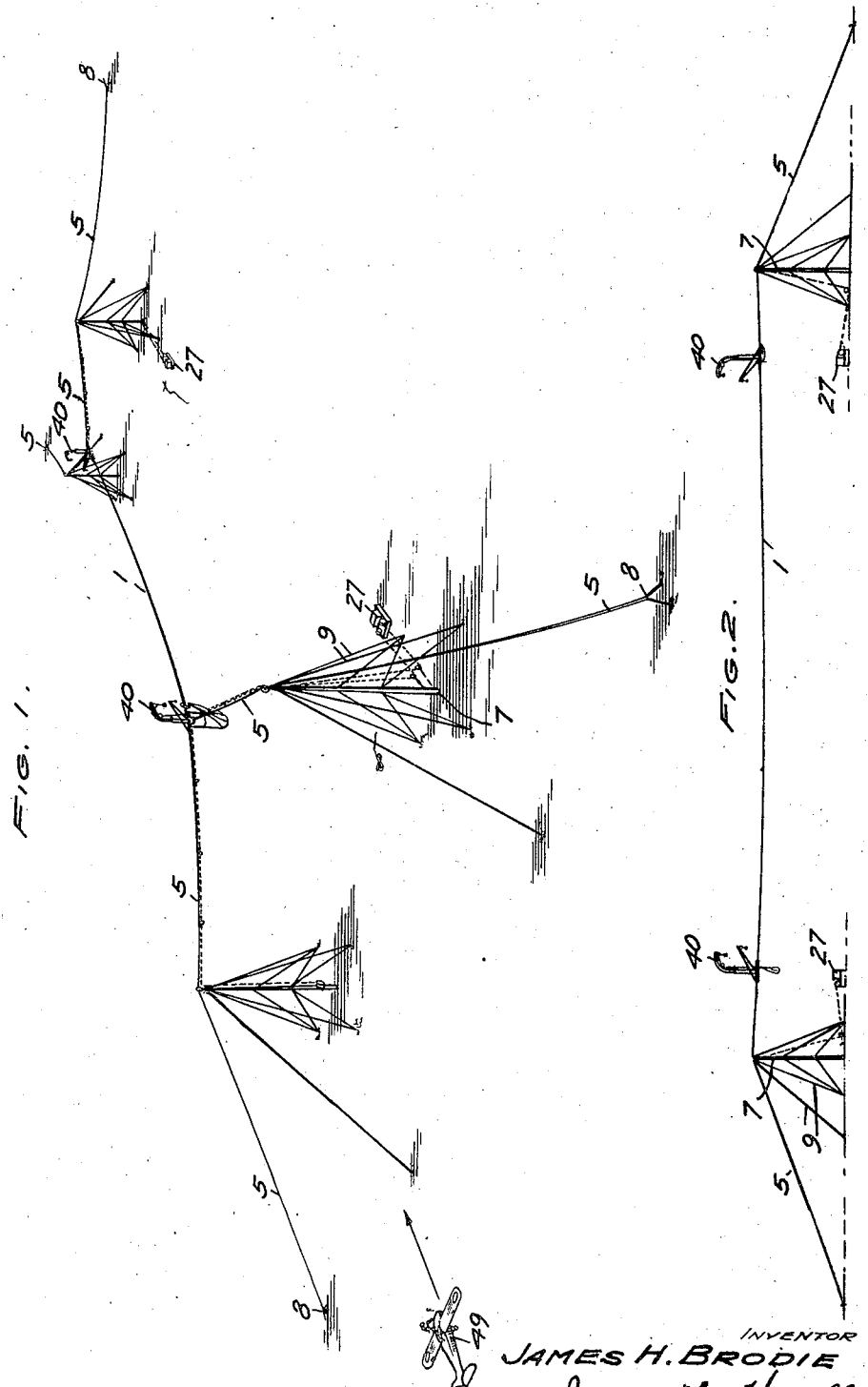
INVENTOR
JAMES H. BRODIE Feb. 3, 1948.   J. H. BRODIE   2,435,197
LANDING AND LAUNCHING APPARATUS FOR AIRCRAFT
Filed Oct. 4, 1944     10 Sheets-Sheet 2
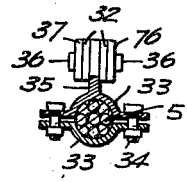
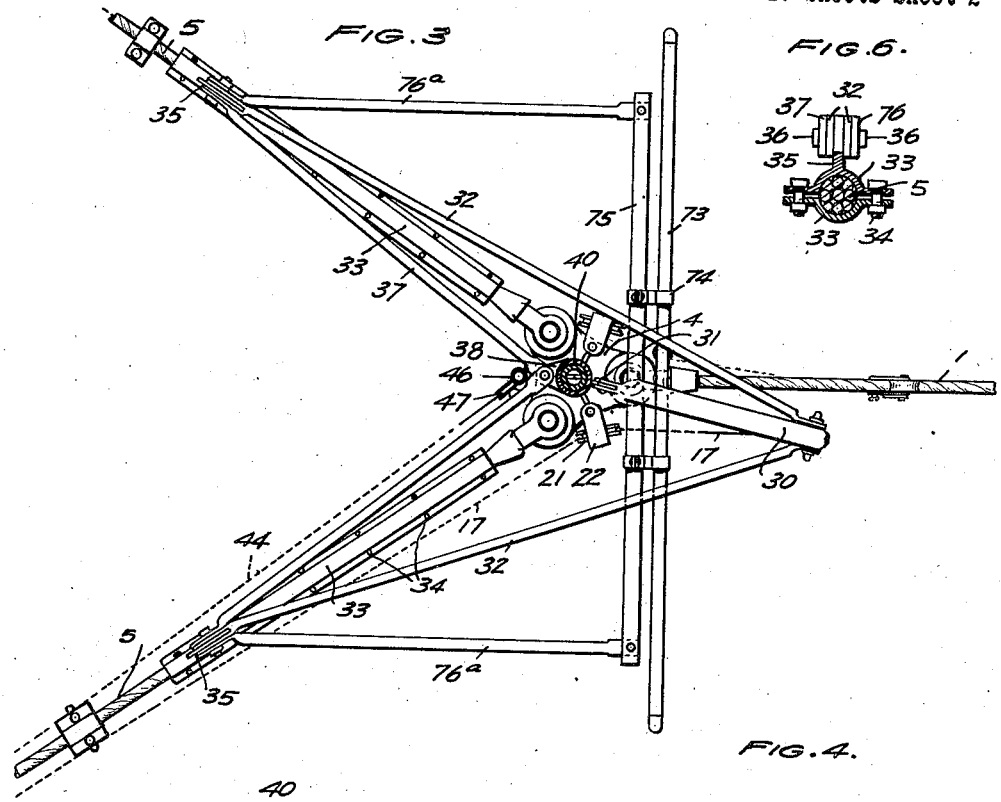
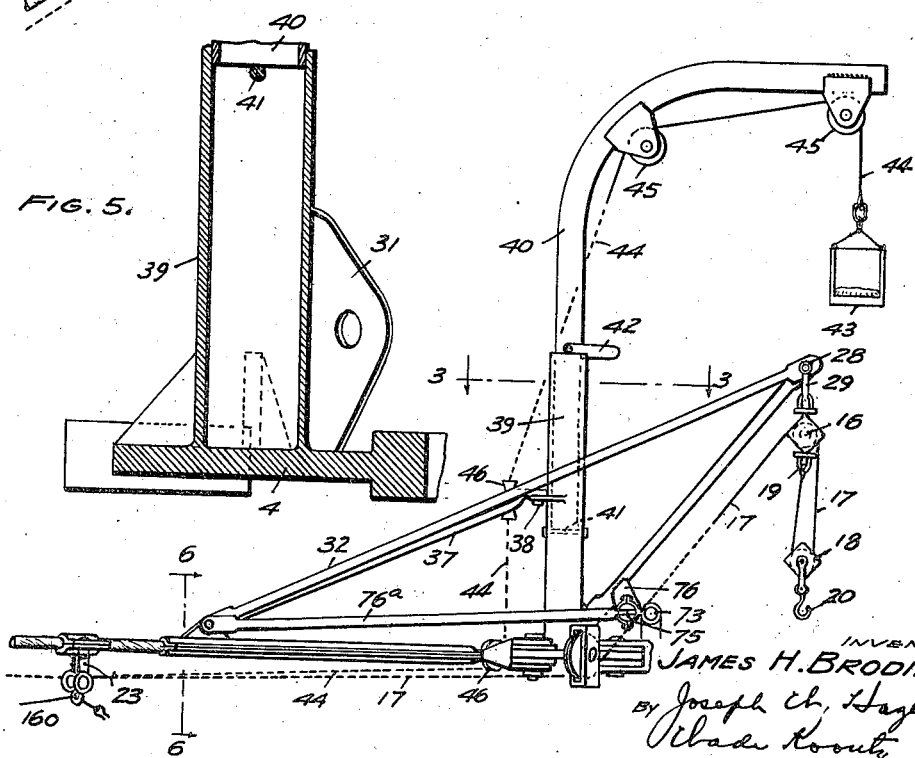
INVENTOR
JAMES H. BRODIE
ATTORNEYS

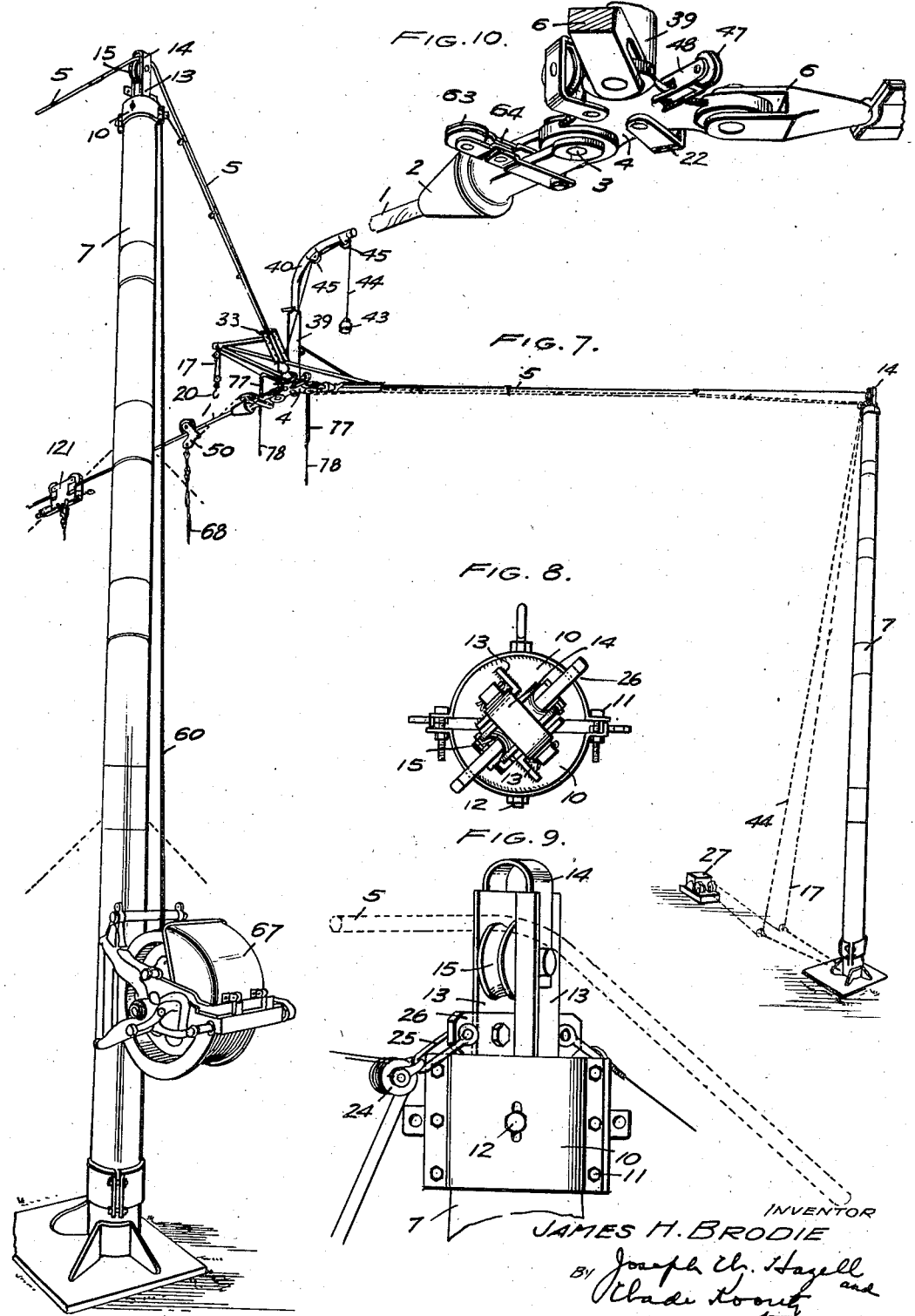

Feb. 3, 1948. J. H. BRODIE 2,435,197
LANDING AND LAUNCHING APPARATUS FOR AIRCRAFT
Filed Oct. 4, 1944 10 Sheets-Sheet 4
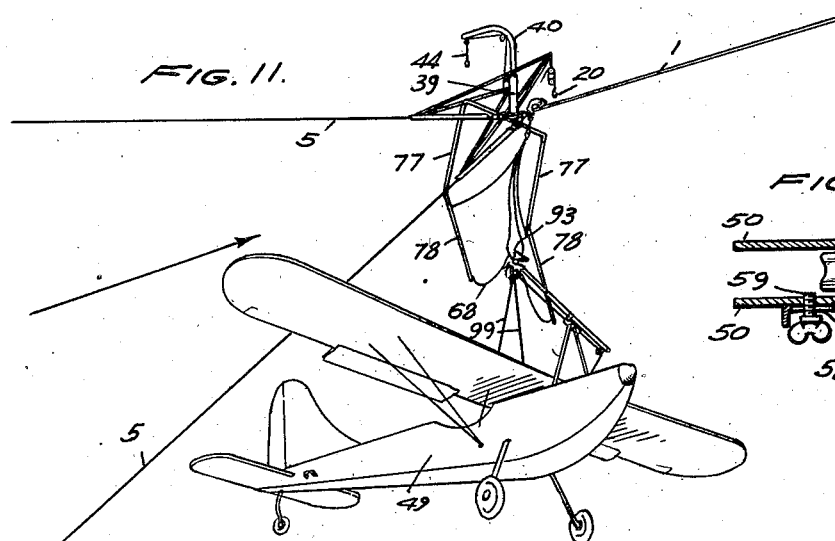
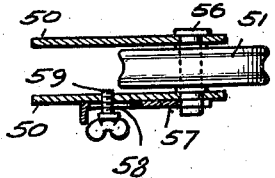
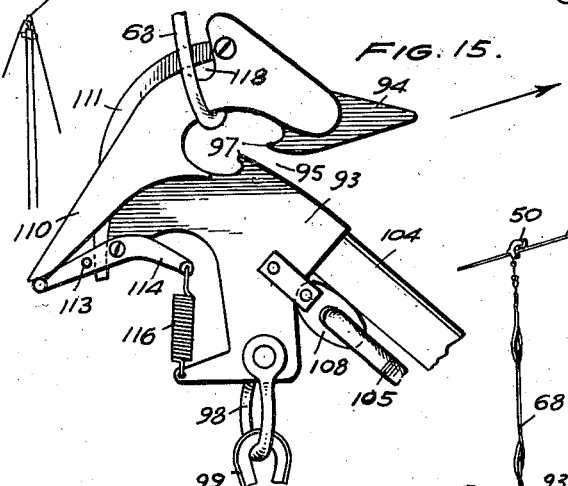
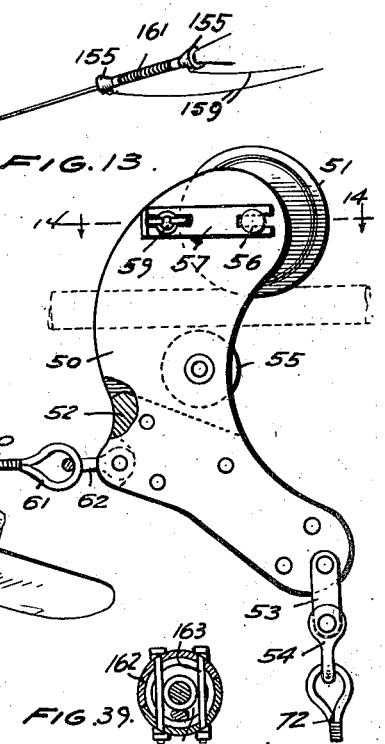
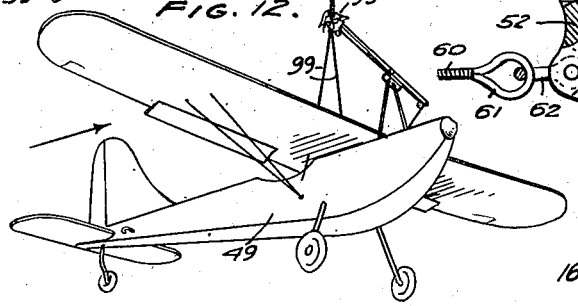
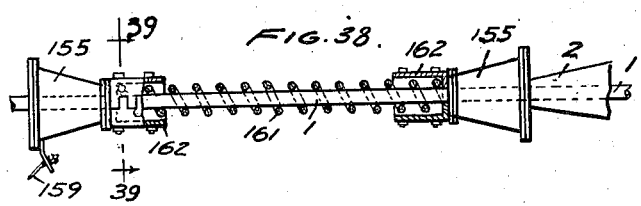
INVENTOR
JAMES H. BRODIE
BY Joseph C. Hazell
and Chale Krouty
ATTORNEYS

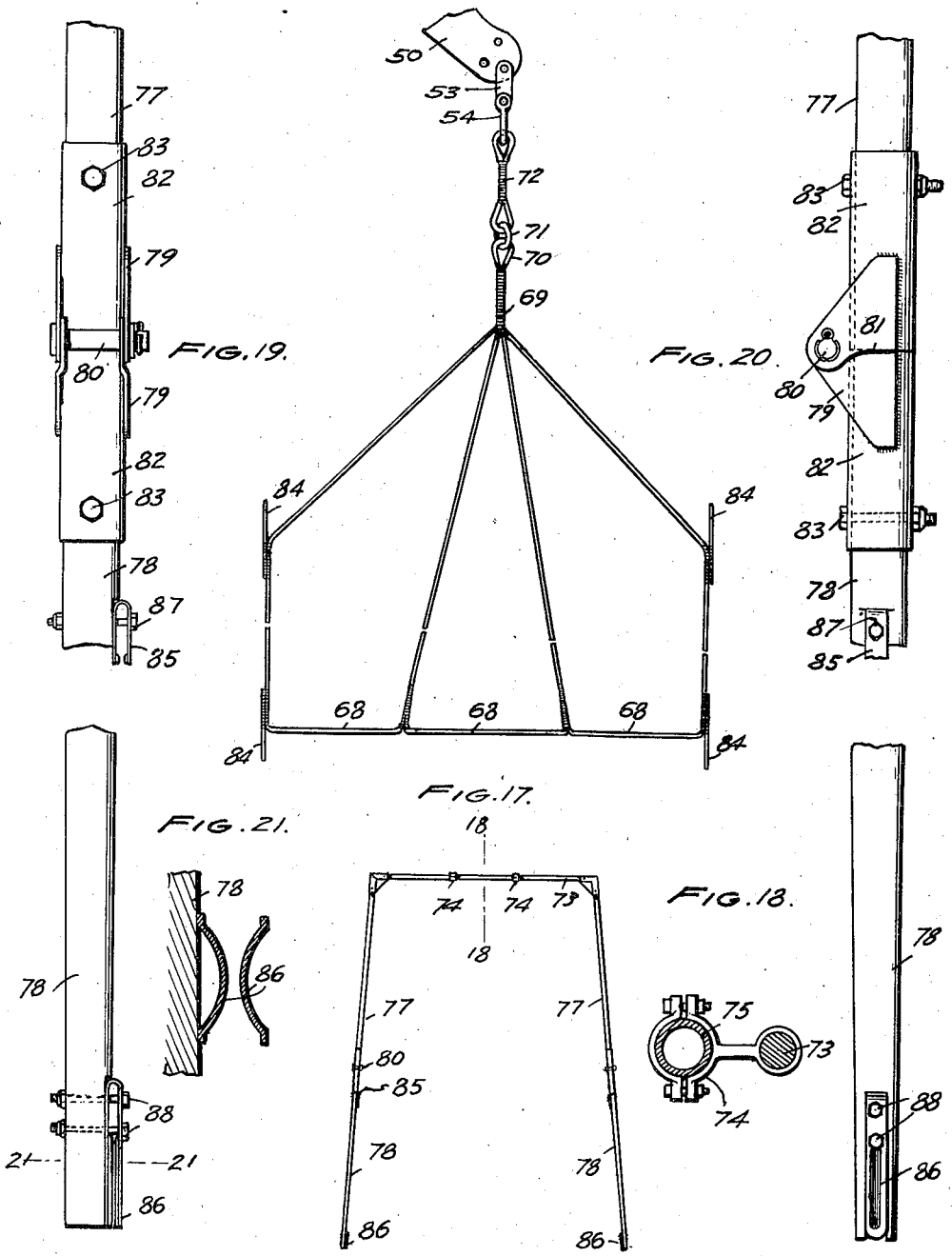

Feb. 3, 1948. J. H. BRODIE 2,435,197
LANDING AND LAUNCHING APPARATUS FOR AIRCRAFT
Filed Oct. 4, 1944 10 Sheets-Sheet 6
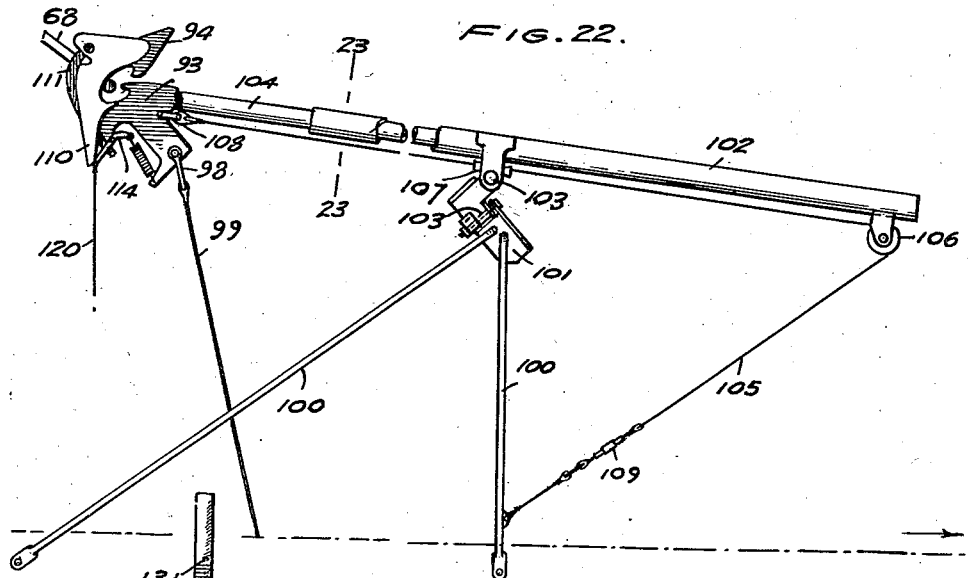
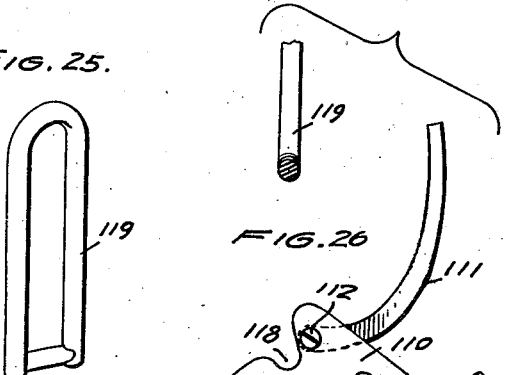
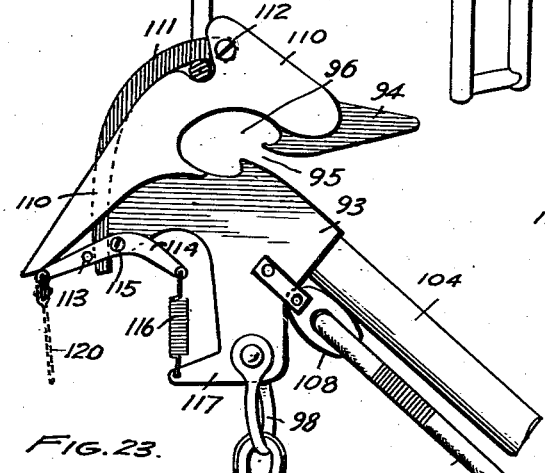
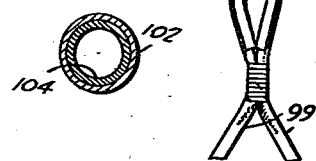
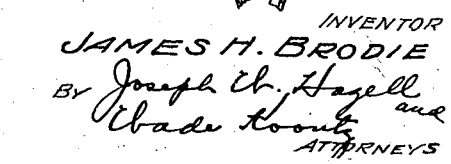
INVENTOR
JAMES H. BRODIE
BY
ATTORNEYS Feb. 3, 1948.  J. H. BRODIE  2,435,197
LANDING AND LAUNCHING APPARATUS FOR AIRCRAFT
Filed Oct. 4, 1944  10 Sheets-Sheet 7
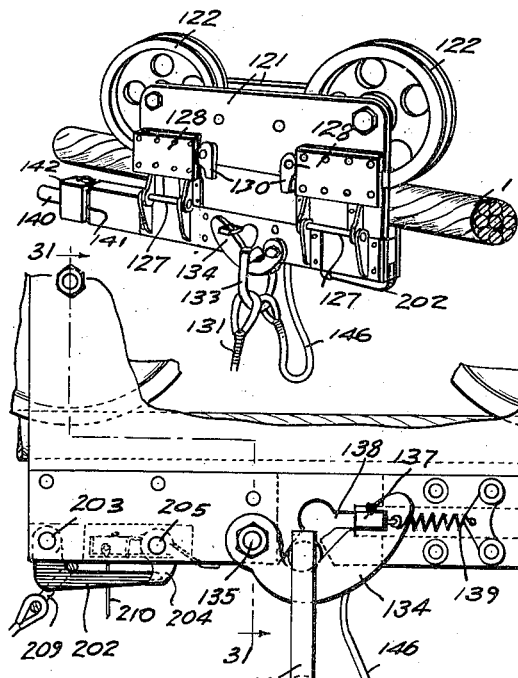
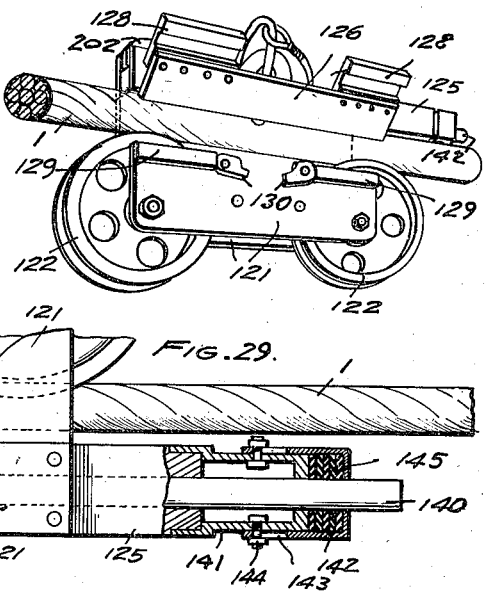
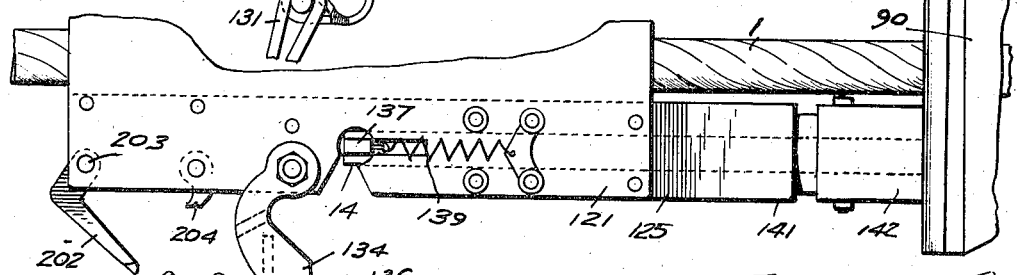
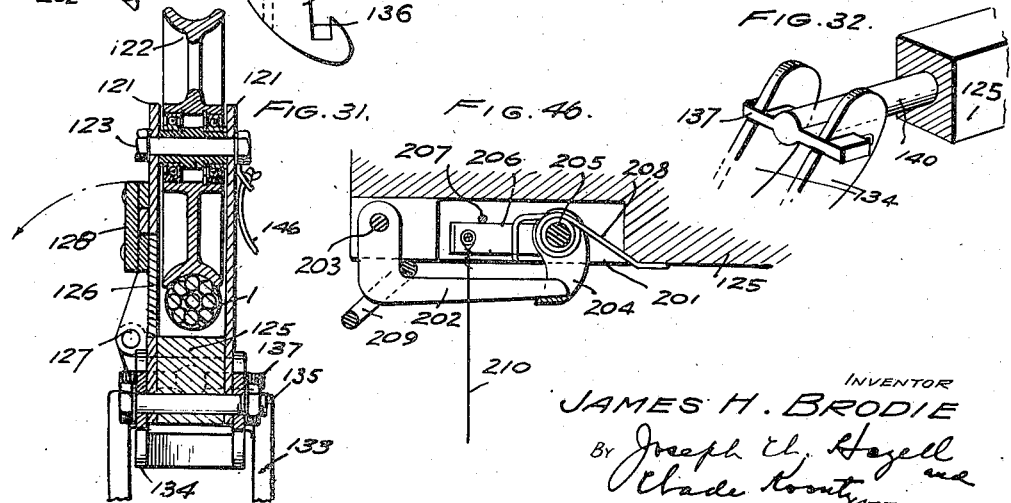
INVENTOR
JAMES H. BRODIE
By Joseph L. Hazell
and Clade Koontz
ATTORNEYS

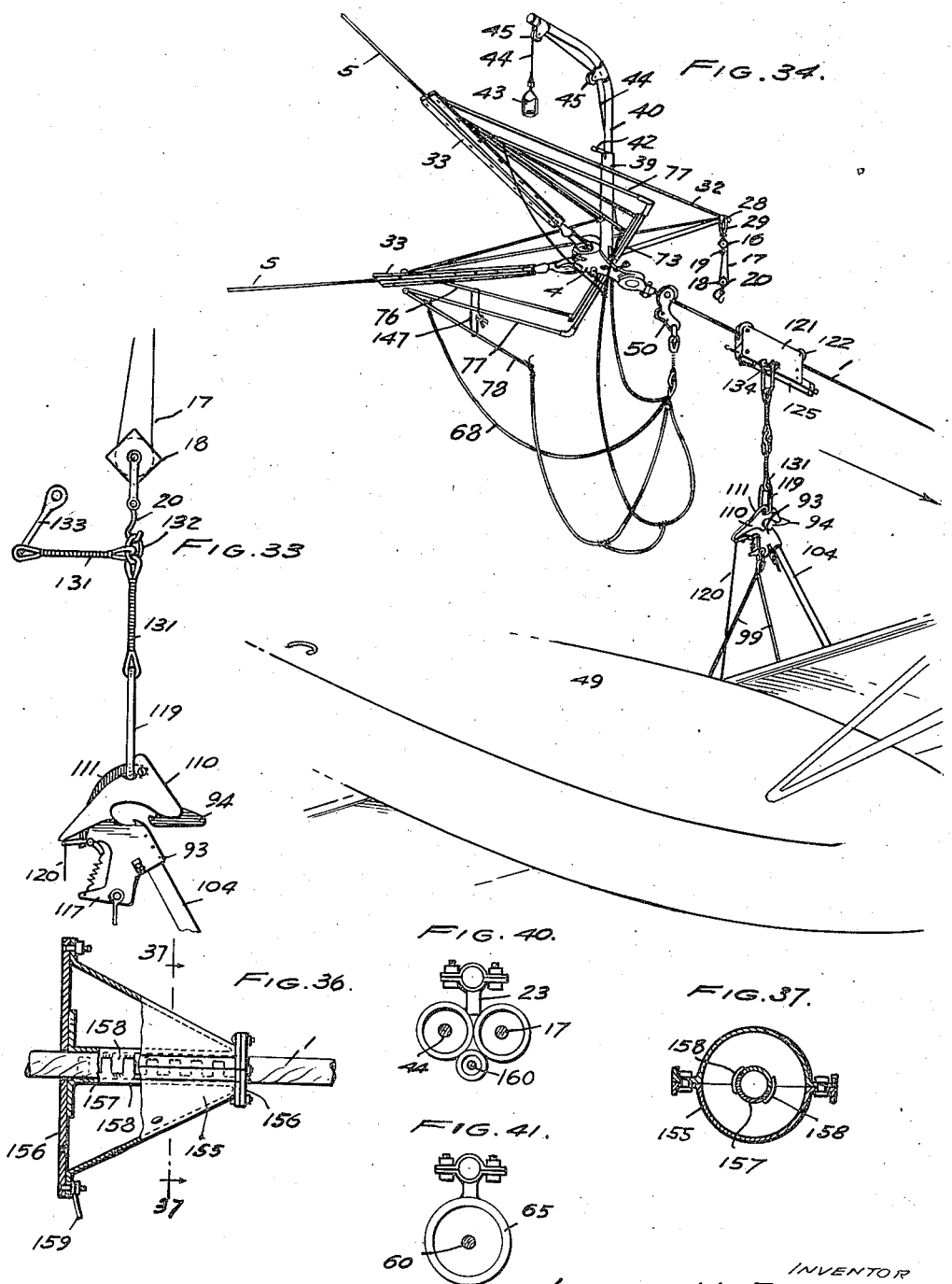

Feb. 3, 1948.  J. H. BRODIE  2,435,197
LANDING AND LAUNCHING APPARATUS FOR AIRCRAFT
Filed Oct. 4, 1944                10 Sheets-Sheet 9

INVENTOR
JAMES H. BRODIE
BY
ATTORNEYS

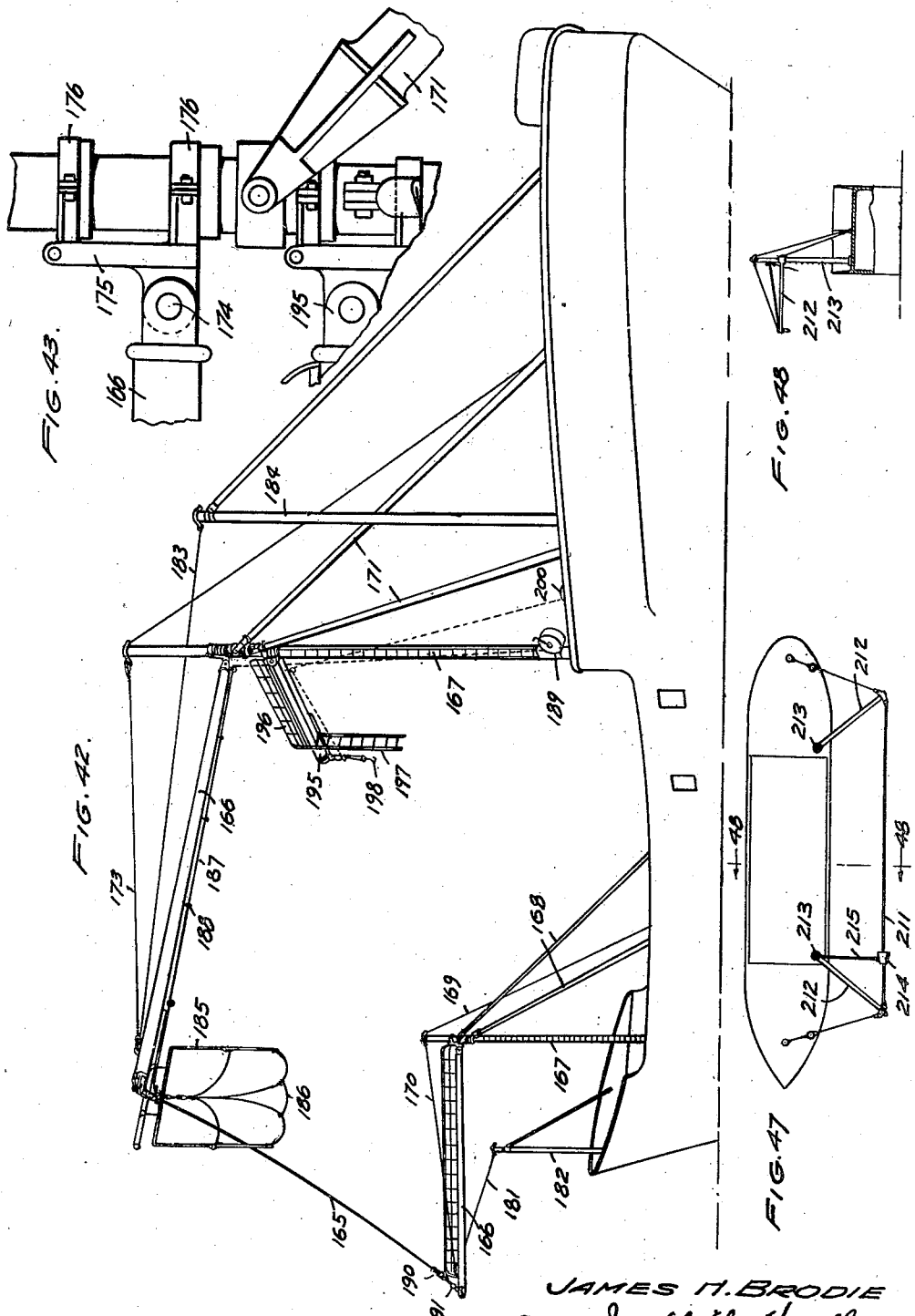

Patented Feb. 3, 1948

2,435,197

UNITED STATES PATENT OFFICE 2,435,197

LANDING AND LAUNCHING APPARATUS FOR AIRCRAFT

James H. Brodie, New Orleans, La.

Application October 4, 1944, Serial No. 557,211

30 Claims. (Cl. 244—110)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to means for landing and launching airplanes under conditions such that the usual runway or its equivalent can not be provided.

It has been proposed heretofore to land and/or launch airplanes from elevated supports such as tracks or cables from which the airplane is suspended during its landing or take off run, but as far as I am aware, none of such previous proposals has ever been put to practical use. In many cases this has been due to failure, in designing such apparatus, to take into account the practical conditions under which the apparatus must operate. In other cases the effort to meet these practical requirements has resulted in such structural and mechanical complications and correspondingly large expense as to render the resulting apparatus impractical.

The present invention provides a novel apparatus which accomplishes the purposes of the prior proposals mentioned above, broadly speaking, but which is characterized by simplicity of construction, low cost, and light weight, and at the same time makes suitable provision for the conditions necessarily encountered in service. The apparatus can be installed on shipboard, or set up in any kind of terrain where the construction of a runway or landing strip is not feasible. It can be made portable and set up or knocked down and moved to a new location in a comparatively short time. It can be transported by airplane and dropped by parachute in otherwise inaccessible locations. No source of power is required to accelerate the airplane for takeoff, as in some known launching devices. For military use, it has the additional advantages that it is difficult to see from above 500 feet, is easily camouflaged, and is structurally a difficult bombing target. To these ends, apparatus embodying the invention comprises many novel features as set forth in detail hereinafter and as defined in the appended claims.

Two embodiments of the invention are illustrated in the accompanying drawings, but it is to be expressly understood that these drawings are for purposes of illustration only and are not to be construed as a definition of the limits of the invention, reference being had to the appended claims for this purpose.

In the drawings:

Figs. 1 and 2 are respectively perspective and side views of a portable apparatus embodying the invention;

Fig. 3 is a detail plan view and Fig. 4 a side view of part of the apparatus;

Fig. 5 is a sectional detail of part of the structure shown in Figs. 3 and 4;

Fig. 6 is a section on the line 6—6 of Fig. 4;

Fig. 7 shows the arrangement of the supporting masts for the runway cable, Figs. 8 and 9 being respectively a plan view and a side view of the top of one of the masts;

Fig. 10 is a detail of the connections between the runway cable and the supporting cables;

Figs. 11 and 12 are perspective views illustrating successive conditions in the landing operation;

Fig. 13 is a detail of the landing trolley;

Fig. 14 is a section on the line 14—14 of Fig. 13;

Fig. 15 is a detail of a hook on the airplane showing its operation in landing the plane;

Fig. 16 shows the landing sling;

Fig. 17 shows a spreader frame for the landing sling, and Fig. 18 is a section on the line 18—18 of Fig. 17;

Figs. 19 and 20 are details of parts of the spreader frame and Fig. 21 is a section on the line 21—21 of Fig. 20;

Fig. 22 illustrates the mounting of the hook on the plane;

Fig. 23 is a section on the line 23—23 of Fig. 22;

Figs. 24, 25 and 26 are details showing the operation and use of the hooking for take off;

Figs. 27 and 28 are perspective views of the launching trolley;

Figs. 29 and 30 are details illustrating the operation and use of the launching trolley;

Fig. 31 is a section on the line 31—31 of Fig. 29;

Fig. 32 is a detail of part of the mechanism of the launching trolley;

Fig. 33 shows the operation of lifting a plane to the runway cable, and Fig. 34 shows the plane as the take off run begins;

Fig. 36 is a detail of a slider on the runway cable, and Fig. 37 is a section on the line 37—37 of Fig. 36;

Fig. 38 is a detail of a cushioning device on the runway cable, and Fig. 39 is a section on the line 39—39 of Fig. 38;

Figs. 40 and 41 are details of cable fairleads;

Fig. 42 illustrates a shipboard illustration of apparatus embodying the invention;

Figs. 43, 44 and 45 are details of the structure of Fig. 42;

Fig. 46 illustrates a detail of the launching trolley as adapted for shipboard use; and Figs. 47 and 48 show a modification of the shipboard installation of Figs. 42-45.

Figure 35:
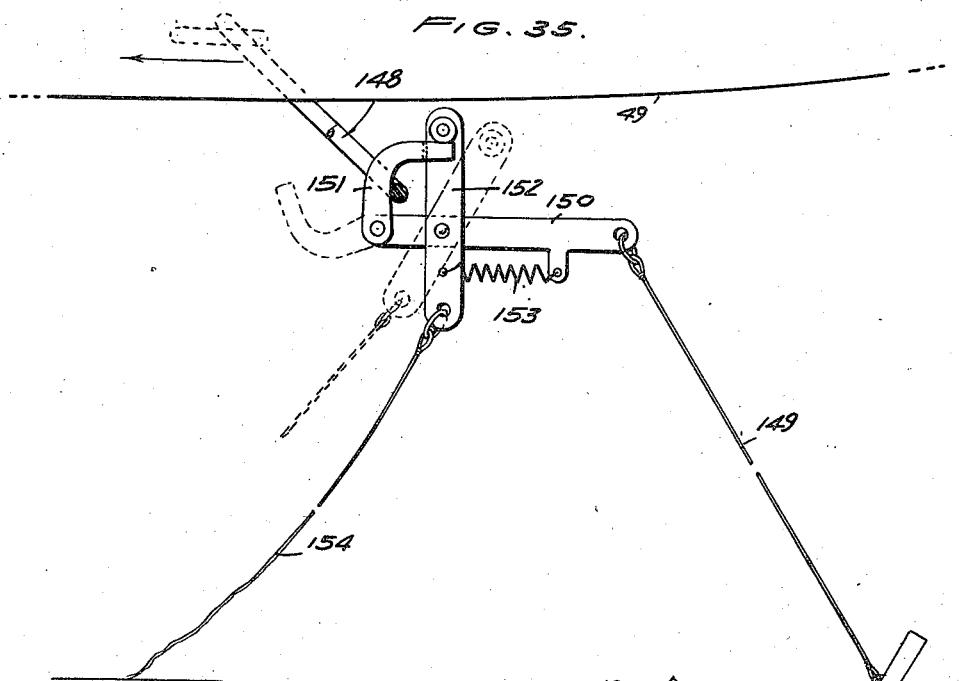
Fig. 35 shows a release mechanism for holding the plane prior to the start of the take off run.

Figs. 1-41 of the above drawings show an embodiment of the invention designed especially as a portable installation which can easily be transported, as for instance, carried by and dropped from an airplane, to remote spots inaccessible by ordinary means of transportation and there set up and operated quickly and easily by a few men. The apparatus thus comprises an elevated runway cable which is suspended above the ground by four portable masts assembled from sections in known manner. To permit an airplane to approach or leave the apparatus in line with the runway cable, each end of the cable terminates in a three-way connection with two guys which spread out in the form of a Y over the tops of two masts, the latter being far enough apart to permit the airplane to fly between them.

The above arrangement is shown as a whole in Figs. 1 and 2. The runway cable 1 is fitted at each end with a socket 2 and pin 3 (Fig. 10) by which it is attached to one corner of a substantially triangular connecting heart plate 4. Guy wires, ropes or cables 5 are connected to the other two corners of the plates 4 by means of shackles or sockets 6 and spread out therefrom in the form of a Y over the tops of masts 7, their other ends being suitably anchored in the ground at 8. The masts are suitably guyed as at 9.

Suitable means are provided for running the guys 5 over the tops of the masts. For example, the top of each mast may be provided with a cap 10 (Figs. 8 and 9) made in two parts clamped around the mast by bolts 11 and held in place by a through bolt 12. Each half of the cap carries a vertical bracket 13, which may suitably comprise a short length of angle iron welded thereto, and these brackets are preferably connected at the top of a U-shaped retaining strap 14 for the guy 5 which runs over a pulley 15 mounted between said brackets.

Thus when the masts 7 are set up and the guys 5 are tightened, the runway cable 1 is suspended in the manner shown in Figs. 1 and 2, but the masts are spaced on either side of the line of flight of an airplane approaching or leaving the runway cable at either end thereof, and there is no obstruction in the path of the plane.

The connecting plates 4 at the ends of the runway cable also serve as supports for means for lowering an airplane to the ground after it has landed or for lifting an airplane into launching or take-off position. As best seen in Figs. 3 and 4, a block 16 is carried at the end of a suitable supporting framework, being located above and at one side of the runway cable. A rope 17, hereinafter referred to as the plane lift rope, runs through the block 16 and a second block 18, the end of this rope being secured to the block 16 at 19. The block 18 carries a hook 20 which is adapted to be used as hereinafter described for lowering or lifting the airplane. The plane lift rope 17 is preferably operated from the ground and to this end it may be run under a pulley 21 mounted in a bracket 22 secured to the connecting plate 4 and then through one or more fairleads 23 (Figs. 4 and 40) along one of the guys 5 to the top of its mast 7. Here it runs over a pulley 24 (Fig. 9) which is shackled at 25 to a bracket 26 secured to one of the supporting angles 13, and thence to the ground. A small winch 27 (Fig. 7) may be used for operating the plane lift rope.

The supporting framework for the block 16 (Figs. 3 and 4) preferably comprises three struts having a common junction 28 carrying a shackle 29 to which the block 16 is attached. The other end of the middle strut 30 is connected to a lug 31 (Fig. 5) forming part of the connecting plate structure as described below. The other ends of the two outer struts 32 are suitably supported on the diverging guys 5. To this end each guy is surrounded near the connecting plate 4 with a two-part sleeve 33 clamped in place by bolts 34 (Figs. 3 and 6). The upper half of this sleeve, near its end remote from the connecting plate, is formed with an upstanding lug or ear 35, the ends of the struts 32 straddling the lugs 35 and being pinned or bolted thereto at 36. For greater strength and rigidity, braces 37 extend one from each of the lugs 35 to a lug 38 which forms part of the connecting plate structure as described below.

The hook 20 must be attached to or detached from the airplane by hand as described hereinafter and the connecting plate structure is accordingly adapted also to carry means for lifting a man for these purposes. As shown in Fig. 5, the connecting plate structure includes a hollow vertical column or socket 39 (to which the lugs 31 and 38 described above are attached), this socket carrying a swinging davit 40 supported on a pin or bolt 41 and the davit having a locking handle 42 which can be used to lock it against turning in the socket. A suitable support such as a bosun's chair 43 is carried by what is hereinafter termed the man lift rope 44 which is preferably operated from the ground. As shown, this rope runs through davit blocks 45 and thence through a vertical fairlead 46 and under a pulley 47 mounted in a bracket 48 extending from the connecting plate 4. From pulley 47 the man lift rope follows the guy 5 together with the plane lift rope 17, running through the fairleads 23 (Fig. 40), over pulley 24 at the top of the mast 7, and thence to the ground and preferably to the winch 27.

It will be understood that the connecting plate structure, the supporting frame and plane lift rope, and the swinging davit and man lift rope are preferably duplicated at the two ends of the supporting cable, so that the airplane can land or take off from either end of the apparatus.

Fig. 1 shows at its lefthand side an airplane 49 approaching the apparatus and about to land thereon. This airplane is provided with a hook device (described in detail hereinafter) which is adapted to engage a sling carried by a trolley running on the cable 1, these parts being specially designed to cushion the initial shock of the engagement of the airplane with the sling and acceleration of the trolley along the cable.

The preferred construction of the landing trolley is shown in Figs. 13 and 14. It comprises spaced parallel side plates 50 carrying a grooved roller 51 between them which rides on the cable 1, the plates being bolted together at the bottom through an interposed spacer block 52. In preparation for landing, this trolley is positioned at the end of the supporting cable that is to be approached by the airplane and normally hangs in the position shown in Fig. 13. The lower part of the trolley is shaped somewhat like a boot, with the toe of the boot extending in the direction in which the trolley moves on the cable when the plane lands. The toe carries a pivoted bracket 53 to which is attached a shackle 54 carrying the landing sling hereinafter described, and as the plane engages the sling, the toe swings upwardly bringing a second roller 55 into engagement with the lower side of the runway cable. This operation provides a pendulum effect on acceleration that reduces some of the inertia forces.

Preferably the trolley is reversible on the supporting cable so that it can be used for landing in both directions, and to this end the roller 51 is mounted on a headed pin 56, the end of the pin projecting through the side plate 50 and being grooved to receive the forked end of a slide 57 and the latter having a slot 58 through which a supporting and locking bolt 59 extends. Thus a man in the bosun's chair 43, by loosening the bolt 59 and operating the slide 57, can easily remove the roller 51, reverse the trolley and replace the roller.

Preferably forward movement of the trolley and airplane supported thereby is suitably braked to bring the plane to a stop. As shown, a brake cable 60 is connected to the heel of the trolley by an eye 61 and a shackle 62, the cable running around a pulley 63 carried by a bracket 64 extending from the socket 2 at the end of the runway cable 1 (Fig. 10) and then following one of the guys 5 (Fig. 7) through fair-leads 65 (Fig. 41) to a pulley 66 at the top of the mast 7, from which it descends the mast to a suitable brake drum or the like 67.

The landing sling itself (Fig. 16) is preferably made of nylon rope to provide both the necessary strength to carry the airplane and elasticity to cushion initial shock of engagement by the moving airplane. It comprises a plurality of loops 68 gathered together at the top at 69 and secured to an eye 70 which engages a ring 71, the sling being hung from the toe of the landing trolley by a connecting member 72 having eyes engaging the ring 71 and the shackle 54.

As the airplane approaches, the sling is releasably held in the spread position shown in Fig. 16 to provide a relatively wide extent for engagement by the hook of the plane (Fig. 15). This is accomplished by a light spreading frame which preferably has the form shown in Figs. 17–20. The top horizontal rod 73 of this frame is slidably and rotatably supported in brackets 74 that are clamped on a tube 75, the latter (Figs. 3 and 4) being carried by a bracket 76 welded to the lifting frame strut 30 (Fig. 4). Braces 76a which extend to the tube 75 from the lugs 35 provide footing for the rigger who adjusts the sling. The ends of rod 73 carry rigid depending rods 77, to the lower ends of which are hinged rods 78. The hinge joints preferably are capable of bending in one direction only, and as shown in Figs. 19 and 20, may conveniently comprise similar plates 79 carried respectively by the rods 77 and 78 and projecting to one side thereof where they overlap and are connected by pivot pins 80, the edges of these plates meeting at 81 (Fig. 20) to prevent the hinges from bending in one direction. If desired, the plates 79 may be secured to sleeves 82 slipped over the ends of the rods 77 and 78 and held in place by bolts 83.

When the apparatus is prepared for landing, the frame 73, 77, 78 hangs down from the tube 75 at one end of the supporting cable, the frame then being as shown in Fig. 17. The landing trolley 50 is drawn up close to the frame and the sling 68 is releasably fastened to the rods 78 of the frame to hold it in the spread position shown in Fig. 16. Preferably this is accomplished by suitably lashing four short rope tails 84 to the outer loops 68 of the sling at points which form the four corners of the spread sling, these tails being engaged in resilient clips 85 and 86 bolted at 87 and 88 to the rods 78. The rod 73 can be slid transversely in its supporting brackets to facilitate this adjustment.

As the hook on the plane engages the sling, the rods 77 swing forwardly by rotation of rod 73 in its supporting brackets, and the rods 78 swing forwardly and upwardly on their pivot pins 80 as shown in Fig. 11. The rope tails 84 are then jerked out of the clips 85 and 86, releasing the sling which stretches out and pulls the trolley 50 along the runway cable until stopped by the brake cable 60. The airplane then hangs from the trolley and sling as shown in Fig. 12.

The trolley 50 with the airplane suspended therefrom is then returned to its starting position at the end of the cable in any suitable manner. Often the plane can taxi along the runway cable, but if necessary the brake cable can be used for this purpose. A man in the bosun's chair 43 then engages the hook 20 with the ring 71 and the plane lift rope 17 is used to lift the plane and take its weight off the sling. The connecting member 72 is then slack so that the shackle 54 can be disconnected from the trolley and the plane then lowered to the ground.

The details of the hook installation on the airplane are shown in Figs. 15 and 22–26. The hook comprises a plate 93 which, for landing purposes, is shaped to provide a jaw member 94 and a relatively narrow opening 95 through which the sling 68 (Fig. 15) passes into a recess 96, the points or barbs 97 preventing the sling from accidentally leaving the recess. The hook plate 92 is shackled at 98 to the ends of two flexible supporting cables 99 which are connected to the airplane preferably at points near its center of gravity. As the airplane moves forward, swinging the sling 68 and the toe of the landing trolley 50 forwardly and upwardly, the cables 99 can swing rearwardly relative to the airplane, the pull being exerted in a straight line through the sling and the cables. At the same time the hook and cables swing downwardly toward the airplane to minimize what might otherwise prove a severe force couple tending to cause the airplane to nose up during landing.

These ends are accomplished by a movable hook support which normally maintains the hook in position to engage the sling (Fig. 11) but is movable rearwardly and downwardly and also laterally on engagement with the sling. Preferably this movement of the hook support is resiliently resisted to assist in cushioning the initial acceleration loads caused by engagement of the plane with the sling and landing trolley. In the form shown, suitable struts and braces 100 (Fig. 22) support a bracket 101 on which a tube 102 is swiveled about the axes 103. A second tube 104 secured to the hook plate 93 telescopes within the tube 102 so that as the hook engages the sling, the telescoping tubes 102, 104 are swung on the pivot 103 at the same time the tube 104 is pulled part way out of the tube 102. This swinging and extension of the telescoping tube system is resiliently resisted, as for example by means of a rubber shock cord 105 connected at one end to the struts 100 and running over a pulley 106 at the end of the tube 102 and through a fairlead 107 to a shackle 108 secured to the hook plate 93. The tension of the cord 105 can be adjusted by means of a turnbuckle 109.

For launching purposes as described hereinafter, two side plates 110 are carried by the hook plate 93 and a pelican hook 111 is pivoted between them at 112. The tail of the pelican hook can be locked in the position shown in Fig. 24 by means of a roller 113 mounted between the two arms of a latch lever 114 that is pivoted on the hook plate at 115, the lever being held in position by a spring 116 connected between its end and a toe 117 on the hook plate. As shown in Fig. 24, the tail of the pelican hook extends between the side plates 110 and between the arms of the latch lever 114 behind the roller 113, the tail of the latch lever being located underneath the side plates so as to be protected thereby against accidental release of the pelican hook. The side plates are shaped to provide a notch 118 closed by the hook 111 to retain therein one end of a U-shaped stirrup 119 (Fig. 25) whereby the airplane can be lifted to launching position as hereinafter described. A trip lanyard 120 attached to the tail of the latch lever can be operated by the pilot to release the pelican hook 111 for the airplane to take off as soon as it becomes airborne under its own power, as shown in Fig. 26.

For launching, the airplane is suspended from a launching trolley running on the runway cable 1 (see Fig. 34). Means are provided for holding the launching trolley at the end of the cable while the motor of the plane is revved up and then releasing the trolley so that the plane can run down the cable, pulling the trolley with it until the pelican hook is tripped as described above.

The details of a suitable form of launching trolley are shown in Figs. 27–32. The trolley comprises a frame consisting of spaced side plates 121 between which are mounted two grooved rollers 122 running on the cable 1. As shown in Fig. 31, the rollers 122 are preferably mounted on pins 123 by suitable bearings, here shown as ball bearings 124, which provide free running action. Beneath the cable 1 the side plates are connected through a spacer block 125, and the weight distribution of the parts is such that as soon as the weight of the suspended airplane is released, the launching trolley inverts itself from the position shown in Fig. 27 to that shown in Fig. 28 wherein the spacer block 125 rides on the runway cable and acts as a brake to slow down the trolley. The trolley may be suitably constructed for removal from the runway cable so that it can be replaced if necessary or reversed for launching in either direction on the cable. In the form shown, one side of the trolley comprises a door 126 mounted by hinges 127 on the side plate 121. For locking the door in closed position, grooved lugs 128 on the door fit over ribs 129 on the side plate when the door is closed, and the door is locked in place by latches 130.

The airplane is suspended from the launching trolley by means of a sling comprising the stirrup link 119 mentioned above, two short connecting members 131 joined by an interposed ring 132 (Fig. 33), and a stirrup link 133. The airplane is lifted from the ground by means of the hook 20 and plane lift rope 17, the hook being engaged in the ring 132 so that the upper connecting member 131 and stirrup 133 are slack. A man in the bosun's chair 43 then engages the stirrup 133 over a curved latch 134 pivoted on a pin 135 at the bottom of the launching trolley. The latch 134 is then closed to the position shown in Fig. 29, in which notches 136 in the latch are engaged by a keeper 137 slidable in slots 138 formed in the side plates 121 and urged toward locked position by tension springs 139. The airplane is then lowered until it is supported by the sling, after which the hook 20 is disengaged.

In case the pilot fails to operate the trip lanyard 120 in time, it is desirable to provide means for tripping the latch 134 automatically at the end of the run of the trolley along the runway cable, the airplane being thus released although carrying away with it the sling 119—131—133. To this end the keeper 137 is connected with a plunger 140 which extends slidably out the end of the trolley and is driven in at the end of the run of the trolley to move the keeper 137 and release the latch 134 as shown in Fig. 30. As shown, the plunger slides through the spacer block 125 and through a casing 141 mounted on the end of the spacer block. An outer telescoping casing 142 slides on the end of the casing 141 by means of slots 143 and studs 144, a rubber block 145 or the like being interposed between the ends of the two casings to absorb shocks.

The trolley 121 acquires considerable momentum as it travels down the runway cable, and even though the pilot operates the trip rope properly, the braking effect of the spacer block 125 may not be enough to stop the trolley before the plunger 140 is operated to release the sling 119—131—133. To prevent the sling falling to the ground in such a case, the stirrup 133 may be tied to the trolley by a light line 146. In case the pilot fails to operate lanyard 120, this retaining line 146 will be easily broken so that the sling is carried away with the plane as described above.

For launching, the landing frame 77—78 is swung rearwardly and upwardly out of the way and tied or otherwise secured to the braces 76 as indicated at 147 (Fig. 34), and as stated above the launching trolley with the plane suspended therefrom above is held at the end of the runway cable by suitable means until the proper time and then released. The holding means which prevents premature travel of the launching trolley may have any suitable form and may be incorporated in the launching trolley as described hereinafter, or separate therefrom and connected to the plane itself as shown in Fig. 35. In the latter case, a link 148 is attached to a fitting near the tail of the airplane and is engaged by a trip mechanism anchored to the ground by the rope 149. The trip mechanism comprises a bar 150 at one end of which the rope 149 is attached and at the other end of which is a pivoted latch 151 held in place by a lever 152 pivoted on the bar intermediate its ends. A spring 153 retains the lever in the position shown in Fig. 35 until it is tripped from the ground by lanyard 154, thereby releasing the plane which moves off down the runway cable. The trip mechanism then falls to the ground.

For returning the launching trolley to starting position, it is desirable to provide a slider on the runway cable, and since this slider will then receive the impact of the plunger 140 of the launching trolley at the end of its run, the slider should be of fairly rugged construction and backed up by a resilient cushion. Figs. 36–39 illustrate suitable forms of such devices. As shown in Figs. 36 and 37, the slider comprises a conical shell 155 made in two halves bolted together and provided with flanged ends to which are secured end plates 156 also made in two halves so that the slider can be assembled on the cable. Held between the two end plates 156 is a two-part sleeve 157 which bears directly on the cable. For greater strength against end shocks, interengaging toothed plates 158 are secured as by welding to the two parts of the sleeve. The slider can be operated from the ground by means of a slider rope 159. When not in use, the end of the slider rope can be tied to the end of a pull-up rope 160 (Fig. 40) which runs through the fairleads 23 along one of the guys 5 and thus hoisted out of the way.

Fig. 38 shows two sliders 155 and an interposed cushioning device, this arrangement being adapted for use at either end of the cable in exactly the same manner. The cushion device comprises a coil spring 161 surrounding the cable and seated at its ends in seats 162 slidable on the cable. As shown in Figs. 38 and 39, these seats are made in two halves, with interengaging teeth along their meeting axial edges. The two halves are connected together by bolts 163 which pass through the coils of the spring and thus anchor it to its seats.

Figs. 42-45 illustrate the use of the invention on board ship. Here the runway cable 165 is rigged outboard of the ship by means of booms 166 mounted to swing on masts 167. As the direction of the ship may be reversed, it is not necessary to provide for operation in both directions along the cable. In the form shown the direction of movement of the plane is forward relative to the ship and this will usually be desirable with the ship headed into the wind.

The forward mast 167 is braced by spars 168 and by a guy 169 running from the top of the mast to a suitable fitting on deck, and the end of the boom is supported by a topping lift 170. The after mast 167 is similarly braced by spars 171 and by a guy 172 running from the top of the masts to the deck, and the end of the boom is supported by a topping lift 173. As illustrated by Fig. 43, the inner ends of both booms may be pivoted as at 174 to brackets 175 that are rotatably mounted on the masts by means of collars or swivels 176.

Figure 44:
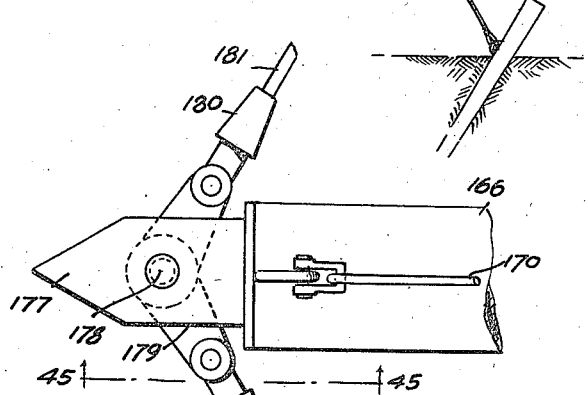
Figure 45:
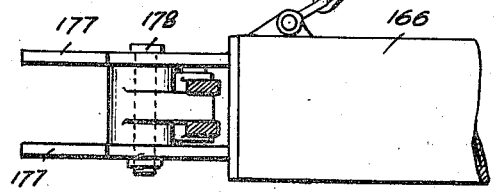

In such an installation the runway cable 165 is preferably of such length as to be stretched between the ends of booms 166 when they are swung outboard as shown. Figs. 44 and 45 illustrate a suitable fitting for the ends of the booms comprising vertically spaced plates 177 and a vertical pivot pin 178. The runway cable is connected to the end of the forward boom 166 by links and/or sockets 179 pivoted on the pin 178, and similar means 180 connect the end of the boom to a cable or rope 181 which runs forward diagonally inboard to a mast or frame 182 in the bow of the ship. A similar arrangement at the end of the after boom comprises a cable or rope 183 running to a mast or frame 184 near the stern of the ship. It will be seen that if the cables 181 and 183 are taut, the supporting cable 165 will be properly suspended between the booms.

For landing, the installation comprises a frame 185 and sling 186 similar to those described above, the sling being suspended from a landing trolley (not shown) like the trolley 50. The brake cable 187 leads from this trolley through fairleads 188 along the bottom of the after boom and then down the boom to a brake device 189. At the forward end of the supporting cable is a slider 190 and cushion device 191 like those described above.

In this type of installation the supporting framework for the plane lifting mechanism is conveniently replaced by a boom 195 mounted to swing about the after mast 167 below the boom 166 and in the same manner. The boom 195 is preferably provided with a walkway and rail 196 and a hanging ladder 197 which take the place of the bosun's chair and man lift mechanism described above. The plane lift hook 198 is carried at the end of the boom 195 and the plane lift rope 199 runs under the boom to the mast and down to a winch 200 on the deck.

In preparation for landing, boom 195 is swung out and a man goes out the boom and adjusts the landing trolley and sling. The boom is then swung out of the way as the plane lands, and then back out again so that ladder 197 can be used for attaching the hook 198 and releasing the sling. The boom is then swung inboard and the plane lowered to the deck.

Launching is carried out in a similar and obvious manner. However, it is not desirable to use trip mechanism of the type illustrated in Fig. 35 since it would fall in the water when the trolley is released. Hence a trip mechanism incorporated in the trolley itself is employed, and a suitable form of such mechanism is illustrated for convenience in Figs. 29, 30 and 46. It will be understood that this trip mechanism can also be used in land installations in place of that shown in Fig. 35, if desired.

Referring to these figures, the spacer block 125 is recessed at the rear end of the trolley as indicated at 201, and a latch 202 is pivoted in the recess on a pin 203. The latch is normally held in the closed position shown in Figs. 29 and 46 by a retaining member 204 pivoted in the recess on a pin 205, said retaining member having an arm 206 held in engagement with a pin 207 by a torsion spring 208. The latch 202 holds a link 209 whereby the trolley is held against forward movement until the latch is tripped by a lanyard 210 connected to the arm 206. The latch then swings to the open position shown in Fig. 30, releasing the link 209 and freeing the trolley for its launching run down the supporting cable as described above.

Figs. 47 and 48 illustrate a modification of the shipboard installation which makes it unnecessary to provide a cushion spring on the runway cable. The cable 211 is supported between booms 212 swinging on masts 213 as described above. The slider 214 on the runway cable is anchored by an elastic rope or cable 215, preferably of nylon, which extends laterally from the runway cable, the slider being normally at a point spaced from the end of the cable. In the form shown, this is conveniently accomplished by rigging the boom 212 at an angle of 45° and connecting the rope 215 to the mast 213. When the launching trolley strikes the slider and moves it down the cable, the rope 215 stretches providing the result of a resilient abutment. It will be understood that a similar arrangement can be used for land installation if desired.

While several embodiments of the invention have been illustrated and described in detail, it is to be understood that the invention is not limited thereto, as various changes in the form, details of construction and arrangement of the parts will now suggest themselves to those skilled in the art without departing from the spirit of the invention. Reference should therefore be had to the appended claims for a definition of the limits of the invention.

What is claimed is:

1. Apparatus of the class described comprising an elevated runway cable, a pair of guys connected to and supporting at least one end of said cable, a three-way connecting member by which said cable and guys are connected with the guys diverging from each other, a pair of masts spaced on either side of the projected line of said cable and carrying guide sheaves for said diverging guys whereby said masts can be erected and said guys thereafter tightened from the ground to support the end of the cable in elevated position without obstructing the flight path of an airplane approaching or leaving the cable, means movable along said cable for suspending an airplane therefrom, means mounted on said connecting member for moving an airplane vertically between said suspending means and the ground, and means supported by the cable and guys for lifting a man to said suspending means.

2. Apparatus of the class described comprising an elevated runway cable, a pair of diverging supporting cables for at least one of the ends of said runway cable, a three-way connecting structure for the ends of the runway and supporting cables, trolley means movable along the runway cable and adapted to suspend an airplane, airplane lifting means carried by said structure and including a line moving to and operable from the ground, and means carried by said structure and including a line running to and operable from the ground for lifting a man to the point of connection of the airplane with said trolley means.

3. Apparatus of the class described comprising an elevated runway cable, a pair of diverging supporting cables for at least one of the ends of said runway cable, a three-way connecting structure for the ends of the runway and supporting cables, trolley means movable along the runway cable and adapted to suspend an airplane, a frame supported at spaced points on said structure and guys, a block and tackle carried by said frame and operable from the ground for lifting an airplane, and means supported by said cables for lifting a man to the point of connection of the airplane with said trolley means.

4. Apparatus of the class described comprising an elevated runway cable, a pair of diverging supporting cables for at least one of the ends of said runway cable, a three-way connecting structure for the ends of the runway and supporting cables, trolley means movable along the runway cable and adapted to suspend an airplane, a frame supported at spaced points on said structure and guys, a block and tackle carried by said frame and operable from the ground for lifting an airplane, and a davit mounted on said structure for lifting a man to the point of connection of the airplane with said trolley means.

5. Apparatus of the class described comprising an elevated runway cable, a pair of diverging supporting cables for at least one of the ends of said runway cable, a three-way connecting structure for the ends of the runway and supporting cables, trolley means movable along the runway cable and adapted to suspend an airplane, sleeves on said guys adjacent the connecting structure, a frame comprising struts mounted on said structure and on said sleeves, a block and tackle carried by said frame and operable from the ground for lifting an airplane, and means carried by said structure for lifting a man to the point of connection of the airplane with said trolley means.

6. Apparatus of the class described comprising an elevated runway cable, trolley means movable along said cable, a sling carried by said trolley means and adapted to be engaged by and to suspend an airplane, said sling comprising a flexible collapsible loop, and a stationary spreader frame depending from the end of the cable and provided with means for releasably holding said sling with the loop spread for engagement by an approaching airplane.

7. Apparatus of the class described comprising an elevated runway cable, trolley means movable along said cable, a sling carried by said trolley means and adapted to be engaged by and to suspend an airplane, said sling comprising a collapsible loop of flexible elastic material, and a stationary spreader frame depending from the end of the cable and provided with means for releasably holding said sling with the loop spread for engagement by an approaching airplane.

8. Apparatus of the class described comprising an elevated runway cable, trolley means movable along said cable, a flexible rope sling carried by said trolley means and adapted to be engaged by and to suspend an airplane, said sling comprising a plurality of lengths of rope depending from the trolley means with their lower ends connected and capable of being spread into a plurality of side-by-side loops, and spreader means at the end of the cable for releasably holding the sling in spread formation until engaged by an airplane.

9. Apparatus as defined in claim 8, said sling being made of elastic rope.

10. Apparatus as defined in claim 8, said sling being made of nylon rope.

11. A sling adapted to be engaged by and to suspend an airplane from an elevated runway, said sling comprising a plurality of lengths of flexible, elastic rope, a supporting means to which said lengths are connected at one end, adjacent lengths being connected together at their other ends to provide a plurality of loops varying in size so that the bottom part of the sling can be spread into substantially rectangular formation with the loops side-by-side and the bottoms of the loops substantially horizontal.

12. Apparatus of the class described comprising an elevated runway cable, trolley means movable along said cable, a sling carried by said trolley means and adapted to be engaged by and to suspend an airplane, said sling comprising a flexible collapsible loop, a stationary spreader frame depending from the end of the cable and provided with means for releasably holding said sling with the loop spread for engagement by an approaching airplane, and means for braking the travel of said trolley means down said cable.

13. Apparatus of the class described comprising an elevated runway cable, trolley means movable along said cable, a sling carried by said trolley means and adapted to be engaged by and to suspend an airplane, said sling comprising a flexible loop, means at the end of the cable for releasably holding said sling with the loop spread for engagement by an approaching airplane, a brake line attached to said trolley means, and a brake drum to which said brake line extends for braking the travel of said trolley means down said cable.

14. Apparatus of the class described comprising an elevated runway cable, trolley means movable along said cable, a sling carried by said trolley means and adapted to be engaged by and to suspend an airplane, said sling comprising a flexible collapsible loop, a stationary spreader frame at the end of the cable, a plurality of rope tails secured to the loop, means for releasably attaching said tails to the frame to hold the sling in spread formation with the bottom of the loop substantially horizontal until engaged by an airplane.

15. Apparatus of the class described comprising an elevated runway cable, trolley means movable along said cable, a sling carried by said trolley means and adapted to be engaged by and to suspend an airplane, said sling comprising a flexible collapsible loop, a stationary spreader frame at the end of the cable, means for releasably attaching the sling to the frame at a plurality of points to hold the sling in spread formation with the bottom of the loop substantially horizontal until engaged by an airplane, said frame being hinged to swing forwardly and upwardly as the sling is pulled away by engagement of an airplane therewith.

16. Apparatus of the class described comprising an elevated runway cable, trolley means movable along said cable, and an airplane supporting device suspended from said trolley means and adapted to be engaged by an approaching airplane, said trolley means comprising a supporting roller running on said cable and carrying a depending pendulum-like structure, said structure swinging forwardly and upwardly relative to the cable about the axis of the roller as the trolley means is pulled away from its starting point by engagement of the airplane with said device, and said device being suspended from said structure.

17. Apparatus of the class described comprising an elevated runway cable, trolley means movable along said cable, and an airplane supporting device suspended from said trolley means and adapted to be engaged by an approaching airplane, said trolley means comprising a supporting roller running on said cable and a depending pendulum-like extension from which said device is suspended, said extension swinging forwardly and upwardly relative to the cable as the trolley means is pulled away from its starting point by engagement of the airplane with said device, said extension having a roller normally spaced from the cable but adapted to swing into engagement with its under side.

18. In apparatus of the class described, a landing trolley adapted to run on an elevated runway, said trolley comprising spaced side plates, a roller mounted between the side plates and adapted to run on top of the cable, the side plates below the roller being connected together to form a swinging pendulum-like extension, and a second roller mounted between the side plates and adapted on swinging said extension to move into engagement with the under side of the cable.

19. Apparatus of the class described comprising an elevated runway cable, a launching trolley running on said cable, and means for suspending an airplane from said trolley for its takeoff run, said trolley comprising roller means running on top of the cable and structure beneath the cable including a braking surface next to but spaced from the cable and the airplane being suspended from said structure, the weight of the trolley above the cable being greater than its weight below the cable whereby, when the airplane takes off, said trolley inverts itself to bring said braking surface into engagement with the top of the cable and to brake further movement of said trolley along the cable.

20. Apparatus of the class described comprising an elevated runway cable, a launching trolley running on the cable, a suspension means attached to the trolley and adapted to be releasably engaged with an airplane to suspend it from the trolley during its takeoff run, a trip mechanism on the airplane for operation by the pilot to release the airplane from the suspension means, buffer means at the end of the cable for stopping the travel of the trolley, and a trip mechanism carried by the trolley and adapted to engage said buffer means to release said suspension means automatically from the trolley.

21. In apparatus of the class described, means on an airplane adapted to engage an elevated trolley and to suspend the airplane therefrom comprising a hook, airplane supporting means extending between and connecting said hook and airplane, said supporting means being yieldable longitudinally and laterally to permit relative fore and aft and lateral movement, and means yieldingly resisting said relative movement.

22. In apparatus of the class described, means on an airplane adapted to engage an elevated trolley and to suspend the airplane therefrom comprising a hook, airplane supporting means extending between and connecting said hook and airplane, said supporting means being yieldable longitudinally and laterally to permit relative fore and aft and lateral movement, a hook support movable with said hook relative to the airplane, and yielding means resisting movement of said support away from normal position.

23. In apparatus of the class described, means on an airplane adapted to engage an elevated trolley and to suspend the airplane therefrom comprising a hook, flexible airplane supporting means extending from said hook to said airplane, a universally swiveling hook support mounted on the airplane, and yielding means resisting movement of said support away from normal position.

24. In apparatus of the class described, means on an airplane adapted to engage an elevated trolley and to suspend the airplane therefrom comprising a hook, flexible airplane supporting means extending from said hook to said airplane, an extensible universally swiveling hook support mounted on the airplane and yielding means resisting movement of said support from normal position.

25. In apparatus of the class described, means on an airplane adapted to engage an elevated trolley and to suspend the airplane therefrom comprising a hook, flexible airplane supporting cables extending from said hook to said airplane, a telescoping hook support universally pivoted on the airplane, and yielding means resisting extension of said telescoping support.

26. Apparatus of the class described comprising an elevated runway cable, trolley means running on the cable, means for suspending an airplane from said trolley means including a flexible suspension member adapted to be releasably connected at its upper end to said trolley means and having a lifting opening below its upper end, and plane lifting means including a hook adapted to be engaged in said opening, the upper part of said member being thereby slack for attachment to or detachment from said trolley means.

27. Apparatus of the class described comprising an elevated runway cable, a launching trolley running on said cable, means for suspending an airplane from said trolley for its take-off run, a slider on the cable near its far end for returning said trolley to starting position, and an elastic rope extending from said slider to one side of the cable for anchoring the slider to serve as a resilient abutment for the trolley.

28. Apparatus of the class described comprising a pair of masts, a pair of swingable booms one on each mast and extending therefrom to one side of a line between the masts, an elevated runway cable extending between the booms, tension guys extending from said booms diagonally to one side of the line of the runway cable for keeping the latter taut between said booms, said guys having the same elevation as the cable over the flight path of an airplane approaching or leaving the cable, trolley means running over the cable, means for suspending an airplane from said trolley means, means including a trip device on the trolley for holding the trolley at one end of the cable, said device being operable from the ship to release the trolley and the suspended airplane for movement along the cable, and airplane lifting means carried by one of said booms to lift the airplane into position to be suspended from said trolley means.

29. Apparatus of the class described comprising a pair of masts spaced longitudinally on a ship, a pair of booms one on each mast and swingable outboard of the ship, an elevated runway cable extending between the booms, tension guys extending from said booms diagonally inboard to the ship for keeping the runway cable taut, said guys outboard of the ship having the same elevation as the runway cable, trolley means running on the cable, means for suspending an airplane from the trolley means, airplane lifting means carried by one of said booms, to lift the airplane into position to be suspended from said trolley means, and a support for a man to adjust the connections between the airplane and the suspension means and lifting means, said support being swingably mounted on said last-named boom.

30. In apparatus of the class described, an elevated runway cable, a trolley movable along said cable, means for detachably suspending an airplane to be launched from said trolley, and a trip device for attachment to the trolley and airplane assembly for holding it stationary at one end of the cable, a cable anchoring said device to the ground, and means for tripping said device from the ground, said device being supported above the ground by its attachment to said assembly prior to tripping and thereafter falling to the ground.

JAMES H. BRODIE.

REFERENCES CITED

The following references are of record in the file of this patent:

UNITED STATES PATENTS

| Number | Name | Date |
| --- | --- | --- |
| 1,311,700 | Lanchester | July 29, 1919 |
| 1,384,036 | Anderson | July 12, 1921 |
| 1,647,619 | Hall | Nov. 1, 1927 |
| 1,731,091 | Belleville | Oct. 8, 1929 |
| 1,738,261 | Perkins | Dec. 3, 1929 |
| 1,748,663 | Tucker | Feb. 25, 1930 |
| 2,369,518 | Ballard | Feb. 13, 1945 |

FOREIGN PATENTS

| Number | Country | Date |
| --- | --- | --- |
| 3,182 | Great Britain | 1914 |
| 10,010 | Great Britain | 1912 |
| 425,639 | France | Apr. 10, 1911 |